(12) United States Patent
Castanha et al.

(10) Patent No.: US 9,180,823 B2
(45) Date of Patent: Nov. 10, 2015

(54) ADAPTIVE DECORATIVE TRIM ASSEMBLIES FOR VEHICLE CABIN INTERIORS

(71) Applicant: EMBRAER S.A., São José Dos Campos (BR)

(72) Inventors: Bruno Kimura Castanha, São José Dos Campos (BR); Fernando Henrique Da Silva, São José Dos Campos (BR); Jay Beever, Melbourne, FL (US); Oliver Turci De Camargo, São José Dos Campos (BR); Joshua Rea, Melbourne, FL (US); Rainer Zierer, Melbourne, FL (US)

(73) Assignee: EMBRAER S.A., São José Dos Campos-SP (BR)

( * ) Notice: Subject to any disclaimer, the term of this patent is extended or adjusted under 35 U.S.C. 154(b) by 15 days.

(21) Appl. No.: 14/261,902

(22) Filed: Apr. 25, 2014

(65) Prior Publication Data

US 2015/0013265 A1     Jan. 15, 2015

Related U.S. Application Data

(60) Provisional application No. 61/823,527, filed on May 15, 2013.

(51) Int. Cl.
| | |
|---|---|
| *E04C 2/38* | (2006.01) |
| *B60R 13/02* | (2006.01) |
| *B64D 11/00* | (2006.01) |
| *B64C 1/06* | (2006.01) |

(52) U.S. Cl.
CPC .......... *B60R 13/0206* (2013.01); *B60R 13/02* (2013.01); *B64C 1/066* (2013.01); *B64D 11/00* (2013.01)

(58) Field of Classification Search
CPC .............. E04B 1/18; E04B 1/19; E04C 2/38; B60R 13/02; B60R 13/0206; B64C 1/066; B64D 11/00
USPC ................. 52/281, 282.2, 282.4, 284, 285.4; 156/228, 245; 244/118.5, 118.6, 119, 244/120, 130
See application file for complete search history.

(56) References Cited

U.S. PATENT DOCUMENTS

| | | | | |
|---|---|---|---|---|
| 2,073,889 | A | * | 3/1937 | Trout ........................... 52/282.4 |
| 3,864,671 | A | * | 2/1975 | Myer .............................. 365/2 |
| 2006/0118676 | A1 | * | 6/2006 | Novak et al. ............... 244/129.1 |

\* cited by examiner

*Primary Examiner* — Jeanette E Chapman
*Assistant Examiner* — James Buckle, Jr.
(74) *Attorney, Agent, or Firm* — Nixon & Vanderhye P.C.

(57) ABSTRACT

Adaptive, self-adjusting decorative trim assemblies are especially adapted for use in aircraft cabin interiors where the fuselage undergoes deformation and/or distortion due to pressurization during flight. The self-adjusting features of the decorative trim assemblies according to the embodiments described herein thus allow for relative movement between mutually intersecting interior cabin panels without jeopardizing the cabin interior aesthetics (e.g., since the relative positioning of the panels is not disrupted by virtue of such fuselage deformations).

16 Claims, 4 Drawing Sheets

ADAPTIVE DECORATIVE TRIM ASSEMBLIES FOR VEHICLE CABIN INTERIORS

CROSS-REFERENCE TO RELATED APPLICATIONS

This application is based on and claims domestic priority under 35 USC §119(e) to U.S. Provisional Application Ser. No. 61/823,527 filed on May 15, 2013, the entire content of such prior filed application being expressly incorporated hereinto by reference

FIELD

The embodiments disclosed herein relate generally to adaptive decorative trim assemblies for vehicle cabin interiors, especially decorative trim assemblies for aircraft interiors.

BACKGROUND

The integration between panels, monuments and divisors along a cabin interior of a transport vehicle, e.g., an aircraft cabin, presents quality problems since major gaps and elevational steps can become visible which in turn create the need for numerous adjustments. These gaps are not however necessarily visible when the interior cabin panels are initially installed during aircraft fabrication while on the ground as all of the panel components and parts will be installed together in a perfectly trimmed relationship. Gaps can and normally do become visible however between installed panels as a consequence of fuselage deformation during normal during flight conditions, e.g., when the fuselage is pressurized.

One traditional well known concept that is widely used to hide or minimize these problems involves adjusting and trimming the finished panels while the aircraft is on the ground, and then to re-adjust the panels again during flight conditions. This re-adjustment of the finished panels helps to achieve the best fit performance for fuselage variation and interior components. However, even this conventional practice still allows for the possibility of non consistent gaps to be visible which are not aesthetically pleasant, while also wasting numerous assembly hours.

Another common alternative is to simply cover the integration region between adjacent interior panels with an overlap finished panel to thereby hide the gap variations. These gap filler panels, however, do not provide perfect matching between surfaces and typically experience serious bonding and/or adhesion issues which require frequent replacement.

What has been needed in this art, therefore, is an assembly of interior passenger cabin panels that is adaptive to different operational environments of the vehicle. It is towards providing such a need that the embodiments of the present invention are directed.

SUMMARY

In general, the embodiments disclosed herein are directed toward adaptive assembly which transitions between interior cabin panels located longitudinally relative to the cabin's longitudinal axis (e.g., cabin interior liner panels such as sidewalls, valances, side ledges, dado panels and ceiling panels) and interior cabin panels located transversally (e.g., cabin partitions, bulkheads and cabinetry monuments positioned generally transverse relative to the cabin's longitudinal axis) and which are relatively easy to install and do not necessarily need adjustment (i.e., are self-adjusting). The embodiments described herein therefore allow interior panels to naturally move during flight in response to fuselage deformation (e.g., which may occur with aircraft pressurization) without jeopardizing the cabin interior aesthetics.

An adaptive, self-adjusting decorative trim assembly for vehicle interiors includes first and second panels positioned relative to one another such that an end of the first panel overlaps an adjacent end of the second panel by a first dimension to establish a visibly perceptible gap therebetween of a second dimension, and a general cross-sectionally L-shaped connector having mutually orthogonal first and second connection legs connected to respective back faces of the first and second panels. At least one panel of the first and second panels is connected to a respective one of the first and second connection legs of the connector to allow for axial movements of the connector in a direction substantially parallel to the at least one panel.

According to some embodiments, the first panel is connected to the first connection leg to allow for axial movements of the connector in a first direction substantially parallel to the first panel. The second panel may thus be connected to the second connection leg such that the second panel is moveable with the connector in the first direction. According to such embodiments, the first panel will include a two-way locator joint comprised of an elongate slot formed in the first connection leg, and a connection pin will be fixed to the first panel and received within the slot.

According to other embodiments, each of the first and second panels is connected to the first and second connection legs to allow for axial movements of the connector in first and second directions substantially parallel to the first and second panels, respectively. Such embodiments will thus include a connector which further comprises an extension leg which is fixed to supporting structure of the vehicle. According to such embodiments, each of the first and second panels comprise respective two-way locator joints comprised of elongate slots formed in the first and second connection legs, and connection pins fixed to the first and second panels and received within a respective one of the slots.

The adaptive, self-adjusting decorative trim assemblies of the embodiments disclosed herein are especially adapted for use in aircraft cabin interiors where the fuselage undergoes deformation and/or distortion due to pressurization during flight. The self-adjusting features of the decorative trim assemblies according to the embodiments described herein thus allow for relative movement between mutually intersecting interior cabin panels without jeopardizing the cabin interior aesthetics (e.g., since the relative positioning of the panels is not disrupted by virtue of such fuselage deformations).

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
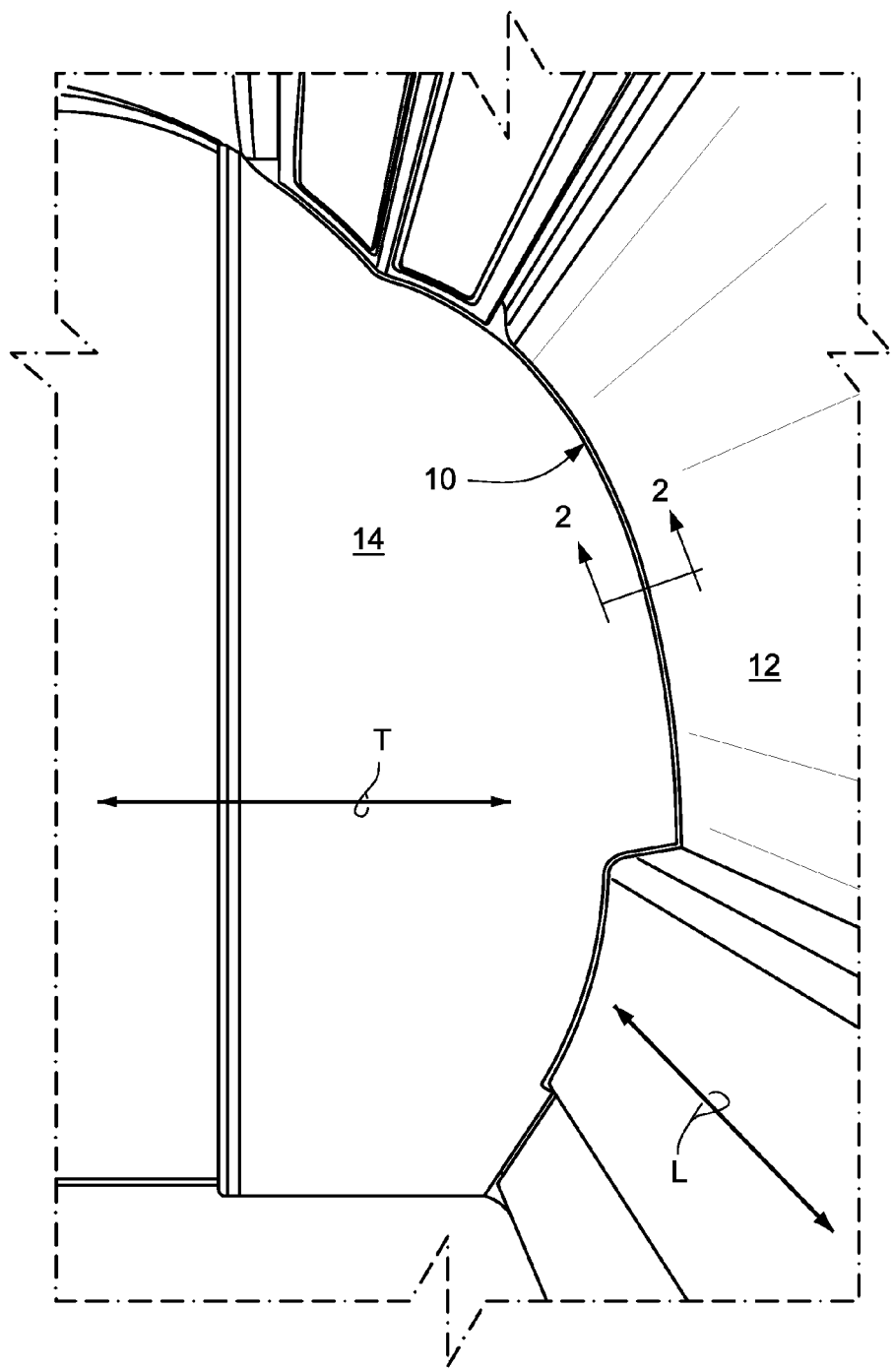
FIG. 1 is a perspective view of an aircraft cabin interior which includes an adaptive trim assembly according to an embodiment of the present invention.
Figure 2:
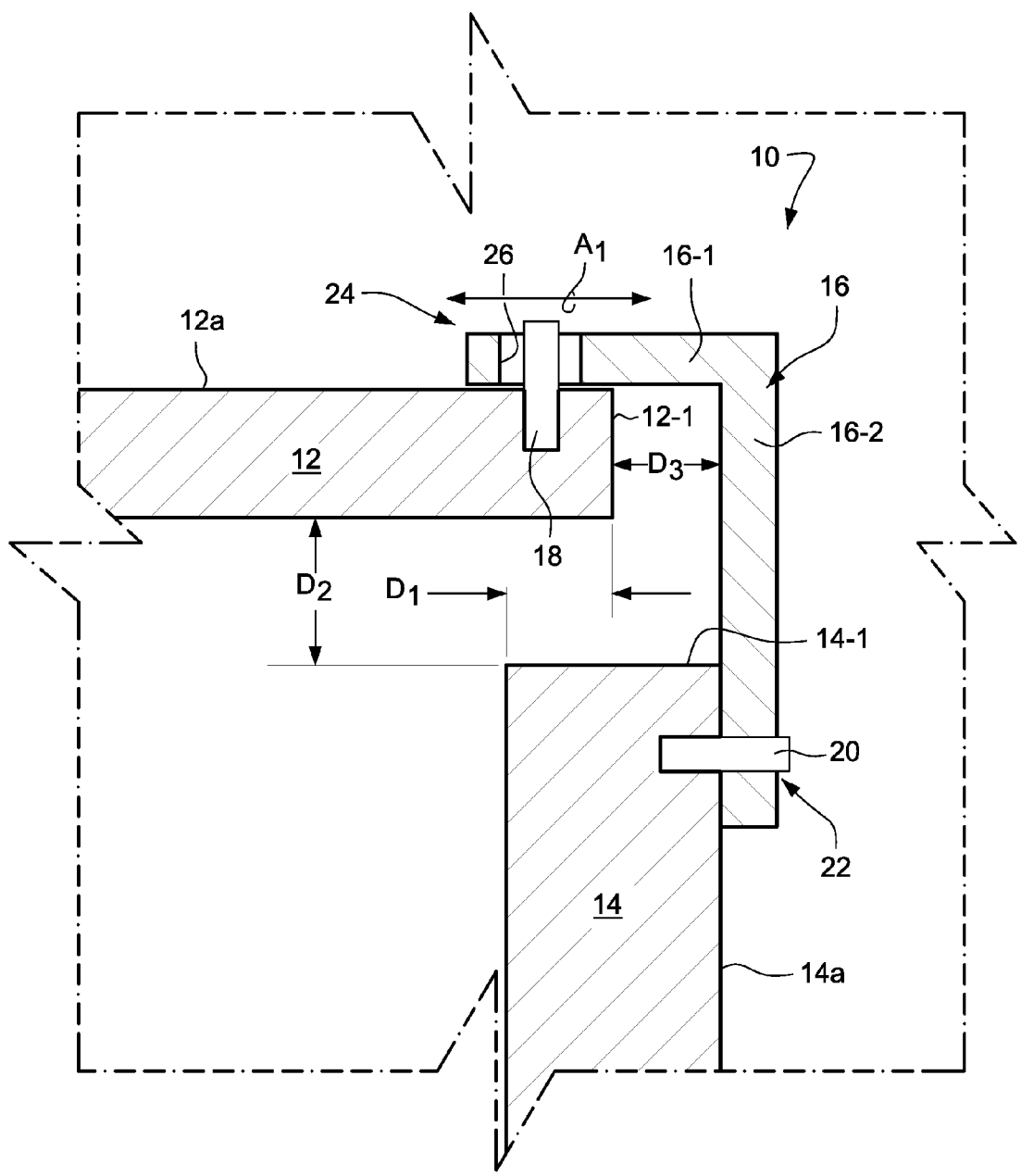
FIG. 2 is a detailed view in cross-section of one embodiment of an adaptive trim assembly as taken along lines 2-2 in FIG. 1.

As shown in FIGS. 1 and 2, the embodiments disclosed herein provide an adaptive trim assembly 10 which transitions between interior cabin panels 12 located longitudinally (linings in general, such as: sidewall, valance, side ledge, dado panel and ceiling) and interior cabin panels 14 located transversally (e.g., cabin partitions, bulkheads and cabinetry monuments positioned generally transverse (arrow T in FIG. 1) relative to the cabin's longitudinal axis (allow L in FIG. 1) which are relatively easy to install without the need for adjustment. The assembly 10 thus allows interior panels 12, 14 to naturally move during flight in response to along with fuselage deformation (e.g., due to aircraft cabin pressurization) without jeopardizing aesthetics. As such, the assembly 10 provides for self-adjustment of the panels 12, 14.

As is perhaps more clearly depicted in FIG. 2, the assembly 10 includes a general cross-sectionally L-shaped connector 16 having mutually orthogonal connection legs 16-1, 16-2 connected to the back faces 12a, 14a of the mutually orthogonally intersecting transverse and longitudinal panels 12, 14 by means of connection pins 18, 20, respectively. As is shown, the edge 12-1 of panel 12 overlaps the adjacent edge 14-1 of panel 14 by a dimension $D_1$ so to provide a controlled or substantially constant gap having a dimension $D_2$ therebetween. The edge 12-1 of panel 12 will thus form a less visible gap of dimension $D_3$ with leg 16-2 of the L-shaped connector 16.

A plurality of the pins 20 are locally distributed along the interior cross-section of the cabin contours of the cabin interior and are joined to the transverse panel 12 to form a four-way locator joint 22 by virtue of the cooperation between the upper part of pin 22 and the leg 16-2. As such, the panel 14 is positionally fixed to the leg 16-2 of the connector 16. In contrast, a plurality of the pins 18 are locally distributed along the interior cross section of the cabin contour and form a two-way locator joint 24 which allows for movement of the L-shaped connector 16 (and hence the longitudinal panel 14) along an axis $A_1$ that is substantially parallel to the panel 12 by virtue of the cooperation of pins 18 within elongated slot 26 formed within the leg 16-1 of the connector 16. In such a manner therefore, the panel 14 and the connector 16 may move in a direction of axis $A_1$ thereby absorbing fuselage deformations that may occur in use (e.g., due to fuselage pressurization during flight conditions) with no impacts on the visible aesthetics to individuals inside the aircraft cabin. That is, by virtue of the two-way connector 24, the visibly perceptible gap of dimension $D_2$ will remain substantially constant since the non-visibly perceptible gap of $D_3$ will be allowed to vary in response to fuselage deformations (i.e., since the overlap of dimension $D_1$ is allowed to vary).

Figure 3:
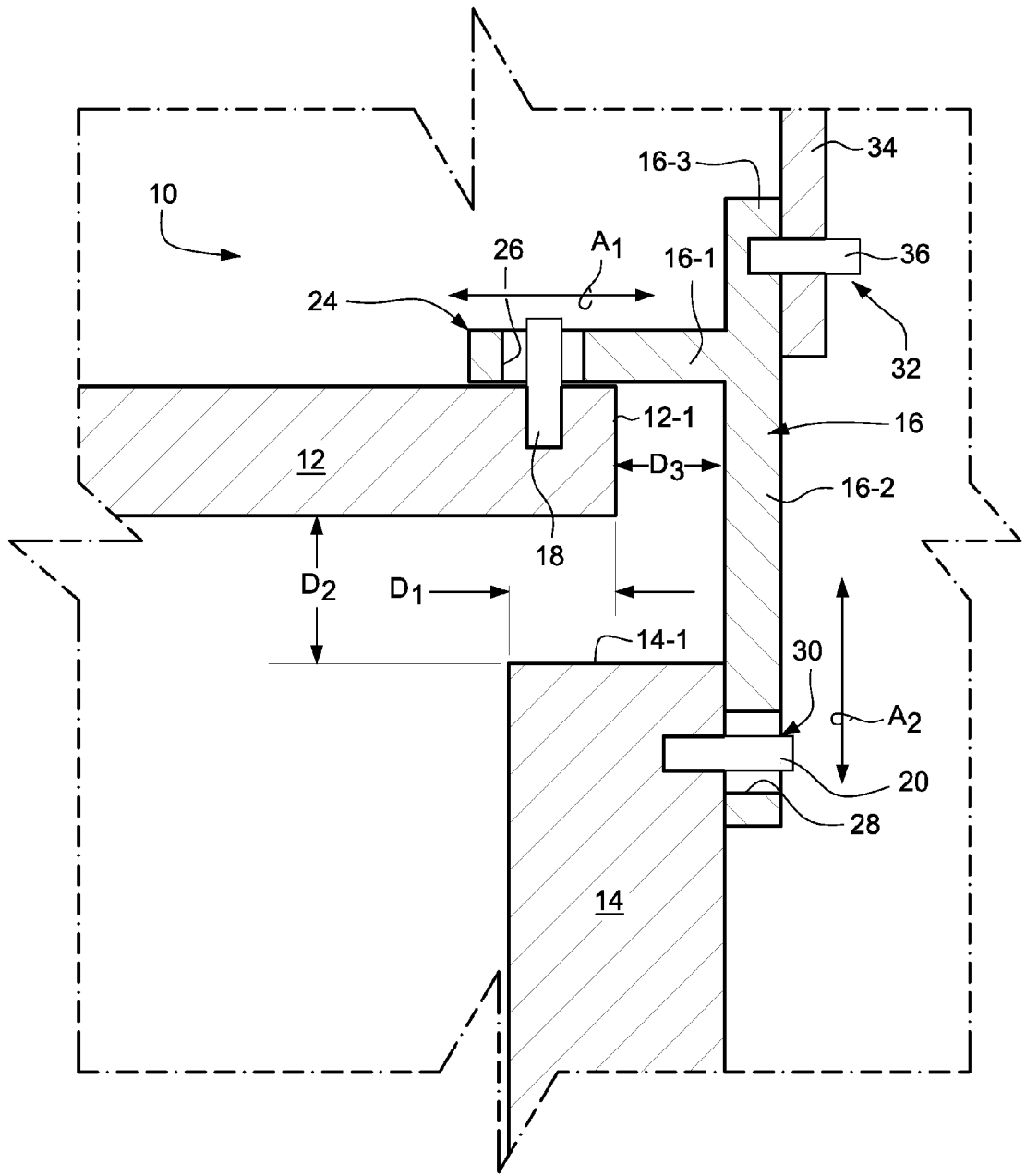
FIG. 3 is a detailed view in cross-section of another embodiment of an adaptive trim assembly similar to the embodiment depicted in FIG. 2.

The embodiment of the adaptive trim assembly 10 as depicted in FIG. 3 is similar to the embodiment discussed above in relation to FIG. 2 except that the pin 20 cooperates in an elongate slot 28 formed in leg 16-1 of connector 16 so as to provide for a two-way locator joint 30. A two-way locator joint 32 is thereby established between an extension flange 16-3 extending oppositely to leg 16-2 of the L-shaped connector 16 and fuselage structure 34 by virtue of mounting pin 36. As in the embodiment discussed above in relation to FIG. 2, the pins 18 and 20 are locally distributed along the interior cross-section of the cabin contours of the cabin interior creating a reference datum for the installation process. The two-way locator joints 24 and 30, however, allow for movements of the L-shaped connector 16 along axes $A_1$ and $A_2$ substantially parallel to the panels 12 and 14, respectively, upon deformation of the fuselage (which may be transmitted to the fuselage structure 34 and to the extension flange 16-3 by virtue of the four-way locator joint 32 established therebetween).

In such a manner, therefore, loads due to such fuselage deformation will substantially not be transmitted to the panels 12, 14 which could in turn cause deformation and misalignment to occur. Thus, in accordance with the embodiment of FIG. 3, the dimension $D_2$ of the visibly perceptible gap between the overhang of end 12-1 and end 14-1 will remain substantially constant within a predetermined tolerance value due to the movements permitted by the L-shaped connector 16 that are permitted to occur along axes $A_1$ and $A_2$.

Figure 4:
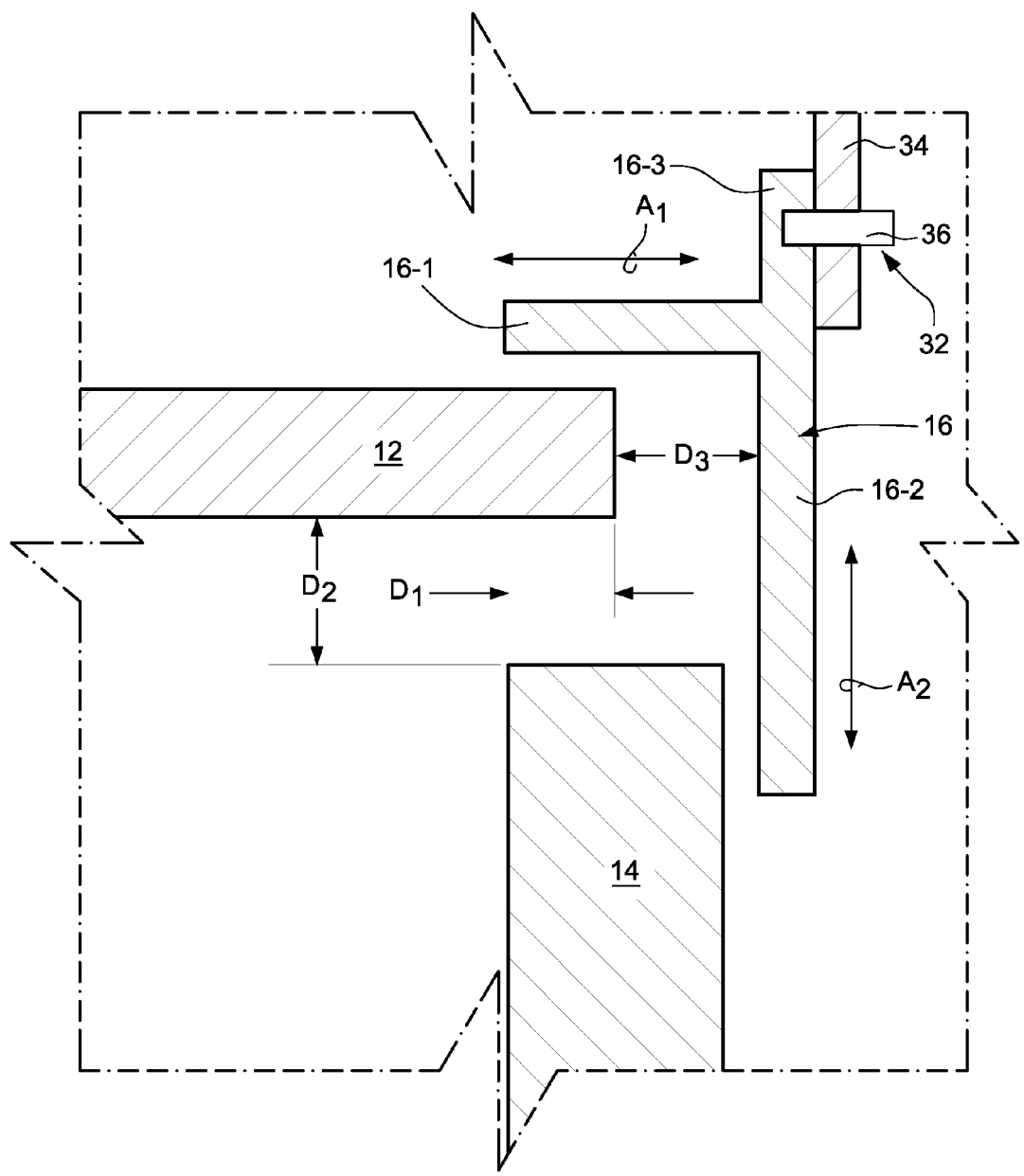
FIG. 4 is a detailed view in cross-section of another embodiment of an adaptive trim assembly similar to the embodiment depicted in FIG. 3.

A further embodiment of an adaptive trim assembly 10 is shown in FIG. 4 which is similar to the embodiment discussed above in relation to FIG. 3 except that the panels 12 and 14 are unconnected to the legs 16-1, 16-2 of the connector 16. Thus, the extension leg 16-3 of the connector 16 is connected to the fuselage structure 34 by virtue of the mounting pin 36 so as to provide for a four-way locator joint 34. Since the panels 12, 14 are unconnected to the connector 16, loads due to fuselage deformation will not be transmitted to the panels 12, 14 which in turn could cause deformation and misalignment to occur. Moreover, the four-way locating joint 34 allows the L-shaped connector 16 to be moveable in the directions of arrows $A_1$ and/or $A_2$ relative to the panels 12, 14 in response to fuselage deformation (i.e., since such fuselage deformation may be transmitted to the fuselage structure 34 and the extension flange 16-3 of the connector 16 by virtue of the connector 36). In such a manner, therefore, the dimensions $D_1$, $D_2$ and/or $D_3$ may vary within predetermined values which do not affect the visual aesthetics.

It will be understood that the description provided herein is presently considered to be the most practical and preferred embodiment of the invention. Thus, the invention is not to be limited to the disclosed embodiment, but on the contrary, is intended to cover various modifications and equivalent arrangements included within the spirit and scope thereof.

What is claimed is:

1. An adaptive decorative trim assembly for vehicle interiors comprising:

first and second panels positioned relative to one another such that an end of the first panel overlaps an adjacent end of the second panel to establish a visibly perceptible gap therebetween; and a general cross-sectionally L-shaped connector having mutually orthogonal first and second connection legs which respectively overlap respective back faces of the ends of the first and second panels, wherein the connector is mounted relative to the first and second panels to allow for axial movements of the connector in at least one direction substantially parallel to at least one of the first and second panels, wherein the connector further comprises an extension leg which is fixed to supporting structure of the vehicle.

2. The assembly as in claim 1, wherein at least one panel of the first and second panels is connected to a respective one of the first and second connection legs of the connector to allow for axial movements of the connector in a direction substantially parallel to the at least one panel.

3. The assembly as in claim 2, wherein the first panel is connected to the first connection leg to allow for axial movements of the connector in a first direction substantially parallel to the first panel.

4. The assembly as in claim 3, wherein the second panel is connected to the second connection leg such that the second panel is moveable with the connector in the first direction.

5. The assembly as in claim 1, wherein each of the first and second panels is connected to the first and second connection legs to allow for axial movements of the connector in first and second directions substantially parallel to the first and second panels, respectively.

6. The assembly as in claim 1, wherein the first and second panels are unconnected to the first and second connection legs of the connector such that the connector is capable of moving in directions parallel to each of the first and second panels.

7. The assembly as in claim 1, wherein the at least one panel comprises a two-way locator joint comprised of an elongate slot formed in the respective one of the first and second connection legs, and a connection pin fixed to the at least one panel and received within the slot.

8. The assembly as in claim 4, wherein the first panel comprises a two-way locator joint comprised of an elongate slot formed in the first connection leg, and a connection pin fixed to the first panel and receiving with the slot.

9. The assembly as in claim 4, wherein each of the first and second panels comprise respective two-way locator joints comprised of elongate slots formed in the first and second connection legs, and connection pins fixed to the first and second panels and received within a respective one of the slots.

10. A self-adjusting trim assembly comprising:
first and second mutually intersecting panels, wherein an end of the first panel overlaps an adjacent end of the second panel by a dimension D1 to establish a visibly perceptible gap of dimension D2 therebetween; and
a general cross-sectionally L-shaped connector having mutually orthogonal first and second connection legs connected to respective back faces of the first and second panels, wherein
the first panel is connected to the first connection leg to allow for axial movements of the connector in a first direction substantially parallel to the first panel, and wherein
the second panel is connected to the second connection leg such that the second panel is moveable with the connector in the first direction such that the dimension D2 remains substantially constant.

11. The assembly as in claim 10, wherein the first panel comprises a two-way locator joint comprised of an elongate slot formed in the first connection leg, and a connection pin fixed to the first panel and receiving with the slot.

12. A self-adjusting trim assembly comprising:
first and second mutually intersecting panels, wherein an end of the first panel overlaps an adjacent end of the second panel by a dimension D1 to establish a visibly perceptible gap of dimension D2 therebetween; and
a general cross-sectionally L-shaped connector having mutually orthogonal first and second connection legs connected to respective back faces of the first and second panels, and an extension leg which extends in a direction opposite to the second connection leg, wherein
each of the first and second panels is connected to the first and second connection legs to allow for axial movements of the connector in first and second directions substantially parallel to the first and second panels, respectively, and wherein
each of the first and second panels comprise respective two-way locator joints comprised of elongate slots formed in the first and second connection legs, and connection pins fixed to the first and second panels and received within a respective one of the slots, and wherein
the extension leg of the connector is fixed to supporting vehicle structure.

13. A self-adjusting trim assembly comprising:
first and second mutually intersecting panels, wherein an end of the first panel overlaps an adjacent end of the second panel to establish a visibly perceptible gap therebetween; and
a general cross-sectionally L-shaped connector having mutually orthogonal first and second connection legs which respectively overlap respective back faces of the ends of the first and second panels, and an extension leg which extends in a direction opposite to the second connection leg, wherein
the extension leg of the connector is fixed to supporting vehicle structure, and wherein
each of the first and second panels is unconnected to the first and second connection legs to allow for axial movements of the connector in first and second directions substantially parallel to the first and second panels, respectively.

14. An aircraft comprising an interior cabin which includes the assembly according to claim 1, 10, 12 or 13.

15. The aircraft as in claim 14, wherein the first panel is at least one selected from the group consisting of sidewalls, valances, side ledges, dado panels and ceiling panels positioned generally longitudinally relative to a longitudinal direction of the interior cabin.

16. The aircraft as in claim 14, wherein the second panel is at least one selected from the group consisting of cabin partitions, bulkheads and cabinetry monuments positioned generally transverse to a transverse direction of the interior cabin.

* * * * *